United States Patent
Schaefer et al.

(10) Patent No.: US 12,168,712 B2
(45) Date of Patent: Dec. 17, 2024

(54) CONTINUOUS PRODUCTION OF A PPG-BASED TPU

(71) Applicant: BASF SE, Ludwigshafen am Rhein (DE)

(72) Inventors: Frank Schaefer, Lemfoerde (DE); Michael Freese, Lemfoerde (DE); Elmar Poeselt, Lemfoerde (DE); Etsuhiro Yamamoto, Yokkaichi (JP); Yasuyuki Suzuki, Yokkaichi (JP); Dai Watanabe, Yokkaichi (JP); Patrick Drawe, Lemfoerde (DE)

(73) Assignee: BASF SE, Ludwigshafen am Rhein (DE)

( * ) Notice: Subject to any disclaimer, the term of this patent is extended or adjusted under 35 U.S.C. 154(b) by 728 days.

(21) Appl. No.: 17/309,421

(22) PCT Filed: Nov. 29, 2019

(86) PCT No.: PCT/EP2019/083115
§ 371 (c)(1),
(2) Date: May 26, 2021

(87) PCT Pub. No.: WO2020/109566
PCT Pub. Date: Jun. 4, 2020

(65) Prior Publication Data
US 2022/0025097 A1 Jan. 27, 2022

(30) Foreign Application Priority Data
Nov. 29, 2018 (EP) .................... 18209089

(51) Int. Cl.
*C08G 18/10* (2006.01)
*C08G 18/32* (2006.01)
*C08G 18/48* (2006.01)

(52) U.S. Cl.
CPC .......... *C08G 18/10* (2013.01); *C08G 18/3206* (2013.01); *C08G 18/4825* (2013.01); *C08G 18/4845* (2013.01)

(58) Field of Classification Search
CPC ................. C08G 18/4825; C08G 18/4845
See application file for complete search history.

(56) References Cited

U.S. PATENT DOCUMENTS

| | | | |
|---|---|---|---|
| 5,905,133 A | 5/1999 | Müller et al. |
| 6,294,637 B1 | 9/2001 | Bräuer et al. |
| 6,930,162 B2 | 8/2005 | Bräuer et al. |
| 9,718,917 B2 | 8/2017 | Wamprecht et al. |
| 2002/0156225 A1 | 10/2002 | Onder |
| 2006/0258831 A1 | 11/2006 | Barksby et al. |
| 2007/0049719 A1 | 3/2007 | Brauer et al. |
| 2020/0048396 A1* | 2/2020 | Richter ................. C08G 18/73 |

FOREIGN PATENT DOCUMENTS

| | | |
|---|---|---|
| DE | 29 01 774 | 7/1980 |
| DE | 196 25 987 | 1/1998 |
| EP | 0 748 828 | 12/1996 |
| EP | 0 900 812 | 3/1999 |
| EP | 1 342 740 | 9/2003 |
| EP | 1 391 472 | 2/2004 |
| EP | 1 746 117 | 1/2007 |
| EP | 1 757 632 | 2/2007 |
| EP | 2 509 127 | 10/2012 |
| WO | 93/24549 | 12/1993 |
| WO | 02/064656 | 8/2002 |
| WO | 2007/101807 | 9/2007 |
| WO | 2014/060300 | 4/2014 |

OTHER PUBLICATIONS

Diller et al., "Rohstoffe", Kunststoffhandbuch, Band 7, Polyurethane, 1993, pp. 57-75.
International Preliminary Report on Patentability mailed on Jun. 3, 2021 in PCT/EP2019/083115, 19 Pages with English translation.

* cited by examiner

*Primary Examiner* — Michael L Leonard
(74) *Attorney, Agent, or Firm* — Grüneberg and Myers PLLC

(57) ABSTRACT

A thermoplastic polyurethane having a glass transition temperature of the soft phase of not more than −25° C. measured using DMA and a heating rate of 2K/min at 1 Hz under torsion based on DIN EN ISO 6721: 2016; maximum G" can be obtained by a process at least including the reaction of a polyol composition including a polypropylene glycol, wherein the proportion of the secondary terminal OH groups based on the total number of terminal OH groups of the polypropylene glycol is in the range of more than 90%, with a polyisocyanate to obtain a polyol composition including a prepolymer and the reaction of the polyol composition including the prepolymer with a polyisocyanate composition including at least one polyisocyanate and at least one chain extender having a molecular weight <500 g/mol. The thermoplastic polyurethane may be used for producing injection molded products, extruded products, films, profiles and shaped articles.

20 Claims, No Drawings

CONTINUOUS PRODUCTION OF A PPG-BASED TPU

CROSS-REFERENCE TO RELATED APPLICATIONS

This application is the National Stage entry under § 371 of International Application No. PCT/EP2019/083115, filed on Nov. 29, 2019, and which claims the benefit of European Application No. 18209089.4, filed on Nov. 29, 2018. The content of each of these applications is hereby incorporated by reference in its entirety.

BACKGROUND OF THE INVENTION

Field of the Invention

The present invention relates to a thermoplastic polyurethane having a glass transition temperature of the soft phase of not more than −25° C. measured using DMA and a heating rate of 2K/min at 1 Hz under torsion based on DIN EN ISO 6721: 2016; maximum G" obtained or obtainable by a process at least comprising the reaction of a polyol composition (PZ-1) at least comprising a polypropylene glycol, wherein the proportion of the secondary terminal OH groups based on the total number of terminal OH groups of the polypropylene glycol is in the range of more than 90%, with a polyisocyanate (P1) to obtain a polyol composition (PZ-2) comprising a prepolymer (PP-1) and the reaction of the polyol composition (PZ-2) comprising the prepolymer (PP-1) with a polyisocyanate composition (PI) comprising at least one polyisocyanate (P2) and at least one chain extender having a molecular weight <500 g/mol. The present invention further relates to a process for producing such a thermoplastic polyurethane and to the use of a thermoplastic polyurethane according to the invention or of a thermoplastic polyurethane obtainable or obtained by a process according to the invention for producing injection molded products, extruded products, films, profiles and shaped articles.

Description of Related Art

Thermoplastic polyurethane elastomers (TPU) are of great industrial importance on account of their excellent mechanical properties and amenability to cost-effective thermoplastic processing. Variation of the input materials makes it possible to obtain different profiles of properties. The synthesis of the thermoplastically processable polyurethane elastomers may be effected either in stepwise fashion (prepolymer metering method) or by simultaneous reaction of all components in one stage (one-shot metering method). Thermoplastic polyurethanes for various applications are known in principle from the prior art.

Thus, WO 2014/060300 A1 discloses a process for producing a thermoplastic polyurethane elastomer based on polyether carbonate polyols. The use thereof for producing extruded or injection molded articles and the articles produced by extrusion or injection molding are likewise disclosed.

WO 2007/101807 A1 discloses a process for continuous production of isocyanate-containing prepolymers, preferably having an NCO content between 1% and 50%, preferably between 1% to 30%, preferably between 1% to 25%, particularly preferably between 3% and 23%, in particular between 4% and 20%, wherein production is performed in an extruder. The invention further relates to processes for producing compact or preferably foamed thermoplastic or crosslinked flexible, semirigid or rigid polyurethanes which may optionally comprise urea, isocyanurate, allophanate and/or biuret structures, wherein prepolymers are employed.

EP 1757632 A1 relates to a process for producing thermoplastically processable polyurethane elastomers (TPU) having improved processing characteristics in a multistage reaction which comprises initially producing a prepolymer which is then further reacted. EP 1391472 A1 also discloses a multistage process for continuous production of thermoplastically processable polyurethane elastomers (TPU) having tensile strengths of >30 MPa (measured according to EN ISO 527-3) via a prepolymer.

EP 900812 A1 discloses a process for continuous production of thermoplastically processable polyurethanes, wherein an isocyanate-terminated prepolymer is intensively mixed with chain extender at temperatures <200° C. and the obtained mixture is reacted in a twin-screw extruder under quasi-adiabatic reaction conditions to afford the thermoplastically processable polyurethane.

DE 19625987 A1 discloses a process for continuous production of thermoplastically processable polyurethanes in which the isocyanate is added in stepwise fashion in a multistage reaction.

Due to its low cost, polypropylene glycol is an interesting input material for the production of thermoplastic polyurethanes. In the conventional continuous process it is disadvantageous to employ unmodified polypropylene glycol (PPG) since the low reactivity of the secondary OH groups leads to secondary reactions and products having inadequate mechanical properties are obtained.

The use of polypropylene glycol as an input material in the production of thermoplastic polyurethanes is disclosed for example in WO 02/064656A2. Thermoplastic polyurethanes are produced in a one-shot process using polyols having a high proportion of secondary hydroxyl groups. WO 93/24549 A1 and US 2006/0258831 A1 also disclose one-shot processes for producing thermoplastic polyurethanes using polyols having secondary OH groups.

EP 1746117 A1 discloses a process for producing isocyanate-containing prepolymers having a low content of monomeric isocyanates by reaction of diisocyanates with at least one compound having more than two isocyanate-reactive hydrogen atoms and optionally subsequent removal of the unconverted monomeric diisocyanates. A one-shot process using prepolymers is disclosed.

SUMMARY OF THE INVENTION

In the processes known from the prior art it is often difficult to adjust the block lengths and hence the properties of the polymer obtained. It was accordingly an object of the present invention to provide thermoplastic polyurethanes/processes for the production thereof which may employ polypropylene glycol and which exhibit good mechanical properties. It was a further object of the present invention to provide a process for cost-effective production of the corresponding polymers.

According to the invention this object is achieved by a thermoplastic polyurethane having a glass transition temperature of the soft phase of not more than −25° C. measured using DMA and a heating rate of 2K/min at 1 Hz under torsion based on DIN EN ISO 6721: 2016; maximum G" obtained or obtainable by a process at least comprising the steps (i) and (ii):

(i) reaction of a polyol composition (PZ-1) comprising at least one polyol based on polypropylene glycol, wherein the proportion of the secondary terminal OH groups based on the total number of terminal OH groups of the polypropylene glycol is in the range of >90%, with a polyisocyanate (P1) to obtain a polyol composition (PZ-2) comprising a prepolymer (PP-1), (ii) reaction of the polyol composition (PZ-2) comprising the prepolymer (PP-1) with a polyisocyanate composition (PI) comprising at least one polyisocyanate (P2) and at least one chain extender having a molecular weight <500 g/mol.

In a further aspect the present invention also provides a process for producing a thermoplastic polyurethane having a glass transition temperature of the soft phase of not more than −25° C. measured using DMA and a heating rate of 2K/min at 1 Hz under torsion based on DIN EN ISO 6721: 2016; maximum G" comprising the steps (i) and (ii):

(i) reaction of a polyol composition (PZ-1) comprising at least one polyol based on polypropylene glycol, wherein the proportion of the secondary terminal OH groups based on the total number of terminal OH groups of the polypropylene glycol is in the range of >90%, with a polyisocyanate (P1) to obtain a polyol composition (PZ-2) comprising a prepolymer (PP-1), (ii) reaction of the polyol composition (PZ-2) comprising the prepolymer (PP-1) with a polyisocyanate composition (PI) comprising at least one polyisocyanate (P2) and at least one chain extender having a molecular weight <500 g/mol.

DETAILED DESCRIPTION OF THE INVENTION

In the context of the present invention measurement is carried out based on DIN EN ISO 6721. In a departure from the parameters specified in the DIN standard the parameters determined in the context of the present invention are measured using a stepped program comparable with a constant 2K/min heating rate program. Measurements are made with a 5 K stepped program and hold times per step of 35s. The measurements are performed on samples having a width to thickness ratio of 1:6.

The process according to the invention may comprise further steps. The process may accordingly comprise further treatment steps before and/or after the steps (i) and (ii) or else a treatment between the steps (i) and (ii). In the context of the present invention further compounds may also be employed in addition to the recited components and compositions.

It is preferable when in the context of the present invention no storage or containerizing of the polyol composition (PZ-2) takes place between the reaction according to step (i) and the reaction according to step (ii).

In a further embodiment the present invention thus also provides a thermoplastic polyurethane as described hereinabove, wherein no storage or containerizing of the polyol composition (PZ-2) takes place between the reaction according to step (i) and the reaction according to step (ii).

It may be advantageous to run the process as a continuous process, for example as an in-line one-shot process. In a further embodiment the present invention thus also provides a thermoplastic polyurethane as described hereinabove, wherein the process is run as a continuous process.

It has surprisingly been found that the thermoplastic polyurethanes according to the invention which are producible using a cost-effective polypropylene glycol having a high proportion of secondary terminal OH groups exhibit good mechanical properties and that transparent products are obtainable.

It has been found that it is possible to use a continuous in-line one-shot process mode (for example in-line one-shot) to produce a prepolymer which is then further reacted, wherein a conversion of <100%. i.e. for example of 90%, in the production of the prepolymer is sufficient to achieve the desired mechanical properties of the thermoplastic polyurethanes produced according to the invention. It is thus possible according to the invention to avoid an uneconomic conversion of the prepolymer of 100% for a TPU in situ process.

In the context of the present invention mechanical properties are determined on injection molded plates previously heat treated at 100° C. for 20 h unless otherwise stated.

According to the invention it is possible, for example for nonpolar polyols, to achieve better compatibility with the chain extender, thus allowing improved molecular weight buildup, through production of a prepolymer. Also possible according to the invention is specific adjustment of the residual NCO content, thus making it possible to influence the block lengths and also the morphology of the obtained thermoplastic polyurethane.

The thermoplastic polyurethanes according to the invention are obtainable/are obtained by a process at least comprising the steps (i) and (ii). The process mode according to the invention makes it possible to use polypropylene glycol to produce the thermoplastic polyurethanes and to run the process specifically such that products having good mechanical and optical properties are obtained.

According to step (i) the polyol composition (PZ-1) comprising a polypropylene glycol is initially reacted with a polyisocyanate (P1) to obtain a polyol composition (PZ-2) comprising a prepolymer (PP-1). The employed polyol composition (PZ-1) comprises a polypropylene glycol, wherein the proportion of the secondary terminal OH groups based on the total number of terminal OH groups of the polypropylene glycol is in the range from 20% to 100%.

According to step (ii) the polyol composition (PZ-2) comprising the prepolymer (PP-1) obtained in the reaction is subsequently reacted with a polyisocyanate composition (PI) comprising at least one polyisocyanate (P2) and at least one chain extender having a molecular weight <500 g/mol.

In the context of the present invention determination of the average molecular weight Mn of the employed polyols is carried out via the OH number unless otherwise stated.

Polypropylene glycols suitable for production of the thermoplastic polyurethanes according to the invention are known in principle. Polypropylene glycols suitable according to the invention include those having a number-average molecular weight Mn in the range from 650 g/mol to 4000 g/mol, in particular a number-average molecular weight Mn in the range from 850 g/mol to 3500 g/mol, more preferably a number-average molecular weight Mn in the range from 950 g/mol to 2500 g/mol, particularly preferably a number-average molecular weight Mn in the range from 1000 g/mol to 2000 g/mol, more preferably a number-average molecular weight Mn in the range from 1200 g/mol to 1750 g/mol, for example a molecular weight Mn of 1400 g/mol.

It has been found that especially polypropylene glycols having higher molecular weights, for example an average molecular weight Mn of more than 2000, result in less favorable mechanical properties of the obtained thermoplastic polyurethane. The use of mixtures of different polypropylene glycols also results in poor mechanical properties.

The employed polyols preferably have a polydispersity Pd of less than 1.5, more preferably in the range from 1.2 to 1.4.

In a further embodiment the present invention thus also provides a thermoplastic polyurethane as described hereinabove, wherein the polypropylene glycol has a number-average molecular weight Mn in the range from 650 g/mol to 4000 g/mol.

In a further embodiment the present invention thus also provides a thermoplastic polyurethane as described hereinabove, wherein the polypropylene glycol has a number-average molecular weight Mn in the range from 1200 g/mol to 1750 g/mol and a polydispersity Pd of less than 1.5.

The process mode according to the invention allows a large portion of the secondary terminal OH groups of the polypropylene glycol to be converted, for example at least 50% of the secondary terminal OH groups of the polypropylene glycol, more preferably at least 70% of the secondary terminal OH groups of the polypropylene glycol, in particular at least 80% of the secondary terminal OH groups of the polypropylene glycol, in particular at least 90% or at least 95%, in particular at least 99%, of the secondary terminal OH groups of the polypropylene glycol.

In a further embodiment the present invention thus also provides a thermoplastic polyurethane as described hereinabove, wherein in the reaction according to step (i) at least 50% of the secondary terminal OH groups of the polypropylene glycol are converted.

According to the invention the reaction according to step (i) is performed such that conversion of the second terminal OH groups of the polypropylene glycol is effected. Temperature and reaction time but also quality of mixing are optimized for example to this end. For example, the reaction may be carried out under adiabatic conditions for a period of 30 minutes. In the context of the present invention the reaction duration is more preferably less than 20 min, in particular less than 10 min. The reaction is preferably run at a temperature of T<160° C., preferably T<150° C., in particular T<140° C.

In the reaction according to step (i) the polyol composition (PZ-1) is reacted with a polyisocyanate (P1). The polyol composition (PZ-1) may comprise further polyols in addition to the polypropylene glycol. In the context of the present invention the proportion of propylene glycol in the polyol composition (PZ-1) is more than 75%, more preferably more than 90%, in particular more than 95%. For example the proportion of propylene glycol in the polyol composition (PZ-1) is in the range from 95% to 99%, in each case based on the total polyol composition (PZ-1).

Suitable polyisocyanates are known per se to those skilled in the art. According to the invention at least one polyisocyanate is employed. Mixtures of two or more polyisocyanates may also be employed according to the invention.

In the context of the present invention preferred polyisocyanates are diisocyanates, especially aliphatic or aromatic diisocyanates, further preferably aromatic diisocyanates.

The process according to the invention has the advantage that the process mode allows different isocyanates to be used for production of the prepolymer and synthesis of the hard phase.

In a further embodiment the present invention thus provides a process as described hereinabove, wherein the polyisocyanate is an aromatic diisocyanate.

Aliphatic diisocyanates employed are customary aliphatic and/or cycloaliphatic diisocyanates, for example tri-, tetra-, penta-, hexa-, hepta- and/or octamethylene diisocyanate, 2-methylpentamethylene 1,5-diisocyanate, 2-ethyltetramethylene 1,4-diisocyanate, hexamethylene 1,6-diisocyanate (HDI), pentamethylene 1,5-diisocyanate, butylene 1,4-diisocyanate, trimethylhexamethylene 1,6-diisocyanate. 1-isocyanato-3,3,5-trimethyl-5-isocyanatomethylcyclohexane (isophorone diisocyanate, IPDI), 1,4- and/or 1,3-bis(isocyanatomethyl)cyclohexane (HXDI), cyclohexane 1,4-diisocyanate, 1-methylcyclohexane 2.4- and/or 2,6-diisocyanate, methylene dicyclohexyl 4,4'-, 2,4'- and/or 2,2'-diisocyanate (H12MDI).

Preferred aliphatic polyisocyanates are hexamethylene 1,6-diisocyanate (HDI), 1-isocyanato-3,3,5-trimethyl-5-isocyanatomethylcyclohexane and methylene dicyclohexyl 4,4'-, 2,4'- and/or 2,2'-diisocyanate (H12MDI); especially preferred are methylene dicyclohexyl 4,4'-, 2,4'- and/or 2,2'-diisocyanate (H12MDI) and 1-isocyanato-3,3,5-trimethyl-5-isocyanatomethylcyclohexane or mixtures thereof.

Suitable aromatic diisocyanates are especially diphenylmethane 2,2'-, 2,4'- and/or 4,4'-diisocyanate (MDI), naphthylene 1,5-diisocyanate (NDI), tolylene 2,4- and/or 2,6-diisocyanate (TDI), 3,3'-dimethyl-4,4'-diisocyanatodiphenyl (TODI), p-phenylene diisocyanate (PDI), diphenylethane 4,4'-diisocyanate (EDI), diphenylmethane diisocyanate, dimethyl diphenyl 3,3'-diisocyanate, diphenylethane 1,2-diisocyanate and/or phenylene diisocyanate. Preferred aromatic diisocyanates are diphenylmethane 2,2'-, 2,4'- and/or 4,4'-diisocyanate (MDI) and mixtures thereof.

In a preferred embodiment the polyisocyanate (P1) is selected from the group consisting of methylenediphenyl diisocyanate (MDI), hexamethylene 1,6-diisocyanate (HDI), 1,5-naphthylene diisocyanate (NDI), 2,4- and/or 2,6-tolylene diisocyanate (TDI), 3,3'-dimethyl-4,4'-diisocyanatodiphenyl (TODI), p-phenylene diisocyanate (PDI), 1-isocyanato-3,3,5-trimethyl-5-isocyanatomethylcyclohexane (isophorone diisocyanate, IPDI) and 4,4'-, 2,4'- and 2,2'-methylenedicyclohexyl diisocyanate (H12MDI).

Preferred examples of polyfunctional isocyanates are triisocyanates, for example triphenylmethane 4,4',4''-triisocyanate, and also the cyanurates of the aforementioned diisocyanates and the oligomers obtainable by partial reaction of diisocyanates with water, for example the biurets of the aforementioned diisocyanates, and oligomers obtainable by specific reaction of semiblocked diisocyanates with polyols having on average more than 2 and preferably 3 or more hydroxyl groups.

According to the invention the polyisocyanate (P1) may be used in pure form or in the form of a composition comprising the polyisocyanate and at least one solvent. Suitable solvents are known to those skilled in the art. Suitable examples are nonreactive solvents such as ethyl acetate, methyl ethyl ketone, tetrahydrofuran and hydrocarbons.

In a further embodiment the present invention thus also provides a thermoplastic polyurethane as described hereinabove, wherein the polyisocyanate (P1) is selected from the group consisting of methylenediphenyl diisocyanate (MDI), hexamethylene 1,6-diisocyanate (HDI), 1,5-naphthylene diisocyanate (NDI), 2,4- and/or 2,6-tolylene diisocyanate (TDI), 3,3'-dimethyl-4,4'-diisocyanatodiphenyl (TODI), p-phenylene diisocyanate (PDI), 1-isocyanato-3,3,5-trimethyl-5-isocyanatomethylcyclohexane (isophorone diisocyanate, IPDI) and 4,4'-, 2,4'- and 2,2'-methylenedicyclohexyl diisocyanate (H12MDI).

The reaction according to step (i) may per se be carried out in any suitable apparatus known to those skilled in the art provided it is ensured that the reaction conditions can be adjusted such that conversion of the secondary terminal OH groups of the propylene glycol is effected.

According to the invention the reaction according to step (i) is carried out for example at a temperature in the range from 60° C. to 300° C. for a time in the range of up to 5 hours to obtain the polyol composition (PZ-2). According to the invention the reaction according to step (i) is preferably carried out for a time in the range from 1 minute to 180 minutes, more preferably in the range of 1 minute to 30 minutes, particularly preferably in the range of 1 minute to 20 minutes.

According to the invention the temperature is by preference in the range from 60° C. to 300° C., preferably in the range from 80° C. to 200° C. and particularly preferably in the range from 80° C. to 150° C.

For example in a process mode in a reactive extruder the reaction duration may be less than 20 min, preferably less than 10 min, in particular less than 5 min, at a reaction temperature of for example in the range from 60° C. to 300° C., preferably in the range from 70° C. to 250° C., especially in the range from 80° C. to 230° C.

For example in a process mode in a belt process the reaction duration may be less than 30 min, preferably less than 20 min, in particular less than 10 min, for example at a reaction temperature in the range from 60° C. to 300° C. preferably in the range from 70° C. to 220° C., especially in the range from 120° C. to 200° C.

Typically the temperature during mixing of the prepolymer into the reaction mixture is in the range from 60° C. to 300° C., preferably in the range from 70° C. to 200° C. and particularly preferably in the range from 80° C. to 150° C.

The reaction according to step (i) is preferably carried out in continuous fashion.

According to the invention the reaction may be carried out in a suitable apparatus, wherein suitable processes are known per se to those skilled in the art. Static mixers, reactive extruders or stirred tanks for example are suitable for the reaction according to step (i). In a further embodiment the present invention thus also provides a thermoplastic polyurethane as described hereinabove, wherein the reaction according to step (i) is carried out in a static mixer, reactive extruder or stirred tank (continuous stirred tank reactor, CSTR) or combinations thereof.

It is possible to employ for example a stirrer in a container or a mixing head and/or a high-speed tubular mixer, a nozzle or a static mixer. The reaction may likewise be carried out in an extruder or a portion of a multi-screw extruder (for example a twin-screw kneader (ZSK)).

The mixing of the components is carried out for example with a mixing apparatus, in particular in a mixing apparatus operating with high shear energy. Examples include a mixing head, a static mixer, a nozzle or a multi-screw extruder.

The temperatures of the extruder housings are advantageously chosen such that the reaction components are completely converted and the possible incorporation of any further assistants/the further components may be performed under the gentlest possible conditions for the product.

By way of example, the reaction according to step (i) may be carried out in a static mixer or reactive mixer/extruder and the reaction according to step (ii) may be carried out in an extruder or belt process.

For example the reaction according to step (i), the reaction according to step (ii) or the reaction according to step (i) and step (ii) may be carried out in an extruder.

In a preferred embodiment of the present invention the reaction according to step (i) is carried out in a static mixer and the reaction according to step (ii) is carried out in a belt process.

According to the invention the reaction according to step (i) affords the polyol composition (PZ-2) comprising the prepolymer (PP-1). According to the invention the polyol composition (PZ-2) is a mixture. According to the invention the mixture may comprise unconverted reactants, i.e. for example unconverted polyisocyanate (P1) or unconverted polyol composition (PZ-1). According to the invention the reaction product is thus present as a mixture, wherein the individual molecules may differ for example in terms of distribution and the length of the blocks.

According to the invention the polyol composition (PZ-2) is further reacted according to step (ii). The polyol composition (PZ-2) may be directly reacted or further polyols may be added.

Further polyols are known in principle to those skilled in the art and described for example in "Kunststoffhandbuch, volume 7, Polyurethane", Carl Hanser Verlag, 3rd edition 1993, chapter 3.1. Particularly preferably employed as further polyols are polyesterols or polyetherols. Particular preference is given to polyeter polyols. The number average molecular weight of the polyols employed in accordance with the invention is preferably between 250 g/mol and 2000 g/mol, preferably between 500 g/mol and 1500 g/mol, in particular between 650 g/mol and 1000 g/mol.

In a further embodiment the present invention thus also provides a thermoplastic polyurethane as described hereinabove, wherein at least one polyol selected from the group consisting of polyether diols, polyester diols and polycarbonates or polycarbonate diols is added to the polyol composition (PZ-2) in the reaction according to step (ii).

In a further embodiment the present invention also provides a thermoplastic polyurethane as described hereinabove, wherein no further polyol is added to the polyol composition (PZ-2) in the reaction according to step (ii).

According to the invention preferred polyetherols are polyethylene glycols and polytetrahydrofurans. Also employable according to the invention are for example mixtures of various polytetrahydrofurans differing in molecular weight.

Suitable examples include a polytetrahydrofuran (PTHF) having a molecular weight Mn in the range from 200 g/mol to 2000 g/mol, more preferably in the range from 250 g/mol to 1500 g/mol, more preferably in the range from 500 g/mol to 1000 g/mol.

According to the invention not only PTHF but also other further polyethers, or else polyesters, are suitable.

In the context of the present invention the polyol composition (PZ-2) may also comprise as further constituents monomeric, short-chain glycols, such as propane-1,3-diol or butane-1,4-diol having a molecular weight Mn of less than 500 g/mol.

The reaction according to step (ii) employs the polyisocyanate composition (PI) comprising a polyisocyanate (P2). The isocyanates previously recited in connection with the polyisocyanate (P1) employed according to the invention are in principle suitable as polyisocyanate (P2). Different polyisocyanates may be employed in the context of the present invention. However, it is also possible to employ the same polyisocyanate as polyisocyanate (P1) and (P2). Suitable polyisocyanates (P2) especially include the abovementioned isocyanates.

In a further embodiment the present invention thus also provides a thermoplastic polyurethane as described hereinabove, wherein the polyisocyanate (P2) is selected from the group consisting of methylenediphenyl diisocyanate (MDI), hexamethylene 1,6-diisocyanate (HDI), 1,5-naphthylene diisocyanate (NDI), 2,4- and/or 2,6-tolylene diisocyanate (TDI), 3,3'-dimethyl-4,4'-diisocyanatodiphenyl (TODI), p-phenylene diisocyanate (PDI), 1-isocyanato-3,3,5-trimethyl-5-isocyanatomethylcyclohexane (isophorone diisocyanate, IPDI) and 4,4'-, 2,4'- and 2,2'-methylenedicyclohexyl diisocyanate (H12MDI).

Step (ii) further employs a chain extender having a molecular weight <500 g/mol. In the context of the present invention this is the weight-average molecular weight. Chain extenders used in the context of the present invention may, for example, be compounds having hydroxyl or amino groups, especially having 2 hydroxyl or amino groups. According to the invention, however, it is also possible that mixtures of different compounds are used as chain extenders. According to the invention, the average functionality of the mixture is 2.

Preference is given in accordance with the invention to using compounds having hydroxyl groups as chain extenders, especially diols. It is preferable to employ aliphatic, araliphatic, aromatic and/or cycloaliphatic diols having a molecular weight of 50 g/mol to 220 g/mol. Preference is given to alkanediols having 2 to 10 carbon atoms in the alkylene radical, especially di-, tri-, tetra-, penta-, hexa-, hepta-, octa-, nona- and/or decaalkylene glycols. Particularly preferred for the present invention are 1,2-ethylene glycol, propane-1,3-diol, butane-1,4-diol, hexane-1,6-diol. It is also possible to employ aromatic compounds such as hydroxyquinone bis(2-hydroxyethyl) ether.

Also employable according to the invention are compounds having amino groups, for example diamines. Likewise employable are mixtures of diols and diamines.

The chain extender is preferably a diol having a molecular weight Mw<220 g/mol. According to the invention, it is possible that only one diol having a molecular weight Mw<220 g/mol is used for preparation of the transparent thermoplastic polyurethane.

In a further embodiment, more than one diol is used as chain extender. It is thus also possible to employ mixtures of chain extenders.

In a further embodiment the present invention thus provides a process as described hereinabove, wherein the chain extender used according to (i) in step (a) of the process according to the invention is a diol having a molecular weight Mw<220 g/mol.

The chain extender is preferably employed in an amount such that the molar ratio of the sum of the functionalities of the components of the employed polyol composition (PZ-2) and the chain extender to the sum of the functionalities of the employed isocyanate composition (PI) is in the range from 1:0.8 to 1:1.3, more preferably in the range from 1:0.9 to 1:1.2, for example in the range from 1:0.95 to 1:1.15.

In a further embodiment the present invention thus also provides a thermoplastic polyurethane as described hereinabove, wherein the molar ratio of the sum of the functionalities of the components of the employed polyol composition (PZ-2) and the chain extender to the sum of the functionalities of the employed isocyanate composition (PI) is in the range from 1:0.8 to 1:1.3.

It is also possible according to the invention to employ additives or assistants to accelerate/to improve the reaction according to step (i) or (ii). In particular, catalysts may be used.

Suitable catalysts are the customary tertiary amines known from the prior art, for example triethylamine, dimethylcyclohexylamine. N-methylmorpholine, N,N'-dimethylpiperazine, 2-(dimethylaminoethoxy)ethanol, diazabicyclo-(2,2,2)-octane and the like and in particular organometallic compounds such as titanate esters, iron compounds, tin compounds, for example tin diacetate, tin dioctoate, tin dilaurate or the tin dialkyl salts of aliphatic carboxylic acids such as dibutyltin diacetate, dibutyltin dilaurate or the like. Preferred catalysts are organometallic compounds, in particular titanate esters, iron compounds and/or tin compounds. Suitable catalysts for the reaction according to step (a) are for example tributyltin oxide, tin(II) dioctoate, dibutyltin dilaurate or Bi(III) carboxylates.

The total amount of catalysts is generally about 0% to 5% by weight, preferably 0% to 1% by weight, based on the sum of the employed components.

In addition to the reaction components and the catalysts it is also possible to add assistants and/or additives in amounts up to 20% by weight based on the total amount of the employed components. They may be dissolved in one of the reaction components, preferably in the polyol component or else added in a subsequent mixing apparatus, for example an extruder, once reaction is complete.

Examples include lubricants, such as fatty acid esters, metal soaps thereof, fatty acid amides, fatty acid ester amides and silicone compounds, anti-blocking agents, inhibitors, stabilizers against hydrolysis, light, heat and discoloration, flame retardants, dyes, pigments, inorganic and/or organic fillers and reinforcers. Reinforcers are in particular fibrous reinforcers such as for example inorganic fibers that are produced according to the prior art and may also be coated with a size. Further details about the recited assistant and additive substances may be found in the technical literature, for example in the monograph by J. H. Saunders and K. C. Frisch "High Polymers", volume XVI, Polyurethane, Part 1 and 2, Interscience Publishers 1962 and 1964 and in Taschenbuch für Kunststoff-Additive, R. Gächter and H. Müller (Hanser Verlag Munich 1990) or DE-A 29 01 774.

To produce the thermoplastic polyurethanes the synthesis components optionally in the presence of catalysts, assistants and/or additives may be reacted preferably in amounts such that the equivalent ratio of NCO groups to the sum of the NCO-reactive groups, in particular the OH groups, of the low molecular weight compounds and the polyols is 0.9:1.0 to 1.1:1.0, preferably 0.95:1.0 to 1.05:1.0.

According to the invention the properties of the obtained thermoplastic polyurethanes may be influenced through choice of the employed polyisocyanates, polyols and chain extenders. The thermoplastic polyurethane according to the invention advantageously has a Shore hardness in the range from 50 A to 80 D determined according to DIN 53505, more preferably a Shore hardness in the range from 60A to 98A, particularly preferably a Shore hardness in the range from 65A to 90 A, in each case determined according to DIN 53505.

In a further embodiment the present invention thus also provides a thermoplastic polyurethane as described hereinabove, wherein the thermoplastic polyurethane has a Shore hardness in the range from 50 A to 80 D determined according to DIN 53505.

The thermoplastic polyurethanes according to the invention are preferably opaque to transparent. In a further embodiment the present invention thus also provides a thermoplastic polyurethane as described hereinabove, wherein the thermoplastic polyurethane is opaque to transparent.

As indicated, the present invention in a further aspect also provides a process for producing a thermoplastic polyurethane comprising the steps (i) and (ii):
 (i) reaction of a polyol composition (PZ-1) comprising a polypropylene glycol, wherein the proportion of the secondary terminal OH groups based on the total number of terminal OH groups of the polypropylene glycol is in the range from 20% to 100%, with a polyisocyanate (P1) to obtain a polyol composition (PZ-2) comprising a prepolymer (PP-1), (ii) reaction of the polyol composition (PZ-2) comprising the prepolymer (PP-1) with a polyisocyanate composition (PI) comprising at least one polyisocyanate (P2) and at least one chain extender having a molecular weight <500 g/mol.

The process according to the invention may comprise further steps, for example temperature adjustments or shaping steps. Having regard to the preferred embodiments, reference is made to the foregoing.

The processing of the obtained thermoplastic polyurethanes may be carried out according to customary processes, for example in extruders, injection molding machines, blow molds, calenders, kneaders and presses.

Good mechanical properties and good thermal behavior make the thermoplastic polyurethanes according to the invention suitable in particular for producing extruded, injection molded and pressed articles and also foams, shoe soles, cable sheathings, hoses, profiles, drive belts, fibers, nonwovens, films, moldings, plugs, housings, damping elements for the electricals industry, automotive industry, mechanical engineering, 3-D printing, medicine and consumer goods, in particular for producing injection molded products, extruded products, films, profiles and shaped articles.

In a further aspect the present invention also provides for the use of a thermoplastic polyurethane according to the invention or of a thermoplastic polyurethane obtainable or obtained by a process according to the invention for producing injection molded products, extruded products, films, profiles and shaped articles.

In a further embodiment the present invention thus also provides for the use of a thermoplastic polyurethane according to the invention or of a thermoplastic polyurethane obtainable or obtained by a process according to the invention for producing injection molded products, extruded products, films, profiles and shaped articles as described hereinabove, wherein the shaped article is a hose, a cable sheathing, seal or film.

The thermoplastic polyurethanes according to the invention are particularly suitable for producing shaped articles such as hoses.

In a further aspect the present invention also provides a hose comprising a thermoplastic polyurethane as described hereinabove or a thermoplastic polyurethane obtainable or obtained by a process according to the invention.

Advantageous embodiments provide for example multi-layered hoses, wherein the hoses according to the invention may have a multilayered construction or else may be reinforced with fibers, fillers or fabrics.

In a further embodiment the present invention thus also provides a hose as described hereinabove, wherein the hose has a multilayered construction. In a further embodiment the present invention also provides a hose as described hereinabove, wherein the hose is reinforced by fibers, fillers or fabrics.

Suitable processes for producing such hoses are known per se and may comprise further steps such as for example an aftertreatment. In a further embodiment the present invention thus also provides a hose as described hereinabove, wherein the hose has been subjected to an aftertreatment.

Further embodiments of the present invention may be found below and in the examples. It will be appreciated that the features of the subject matter/processes/uses according to the invention recited above and elucidated below may be used not only in the combination specified in each case but also in other combinations without departing from the scope of the invention. Thus for example the combination of a preferred feature with a particularly preferred feature or of a not further characterized feature with a particularly preferred feature etc. is also implicitly comprehended even if this combination is not explicitly mentioned.

Exemplary embodiments of the present invention are recited hereinbelow but are in no way intended to limit the present invention. The present invention especially also comprehends embodiments resulting from the dependency references and thus combinations specified hereinbelow.

1. Thermoplastic polyurethane having a glass transition temperature of the soft phase of not more than −25° C. measured using DMA and a heating rate of 2K/min at 1 Hz under torsion based on DIN EN ISO 6721: 2016; maximum G" obtained or obtainable by a process at least comprising the steps (i) and (ii):
   (i) reaction of a polyol composition (PZ-1) comprising at least one polyol based on polypropylene glycol, wherein the proportion of the secondary terminal OH groups based on the total number of terminal OH groups of the polypropylene glycol is in the range of >90%, with a polyisocyanate (P1) to obtain a polyol composition (PZ-2) comprising a prepolymer (PP-1),
   (ii) reaction of the polyol composition (PZ-2) comprising the prepolymer (PP-1) with a polyisocyanate composition (PI) comprising at least one polyisocyanate (P2) and at least one chain extender having a molecular weight <500 g/mol.

2. Thermoplastic polyurethane according to embodiment 1, wherein no storage or containerizing of the polyol composition (PZ-2) takes place between the reaction according to step (i) and the reaction according to step (ii).

3. Thermoplastic polyurethane according to either of embodiments 1 or 2, wherein the process is run as a continuous process.

4. Thermoplastic polyurethane according to any of embodiments 1 to 3, wherein in the reaction according to step (i) at least 30% of the secondary terminal OH groups of the polypropylene glycol are converted.

5. Thermoplastic polyurethane according to any of embodiments 1 to 4, wherein the polypropylene glycol has a number-average molecular weight Mn in the range from 650 g/mol to 4000 g/mol.

6. Thermoplastic polyurethane according to any of embodiments 1 to 5, wherein the polypropylene glycol has a number-average molecular weight Mn in the range from 1200 g/mol to 1750 g/mol and a polydispersity Pd of less than 1.5.

7. Thermoplastic polyurethane according to any of embodiments 1 to 6, wherein the reaction according to step (i) is carried out in a static mixer, reactive extruder or stirred tank (continuous stirred tank reactor, CSTR) or combinations thereof.

8. Thermoplastic polyurethane according to any of embodiments 1 to 7, wherein at least one polyol selected from the group consisting of polyether diols, polyester diols and polycarbonates or polycarbonate diols is added to the polyol composition (PZ-2) in the reaction according to step (ii).

9. Thermoplastic polyurethane according to any of embodiments 1 to 7, wherein no further polyol is added to the polyol composition (PZ-2) in the reaction according to step (ii).

10. Thermoplastic polyurethane according to any of embodiments 1 to 9, wherein the polyisocyanate (P2) is selected from the group consisting of methylenediphenyl diisocyanate (MDI), hexamethylene 1,6-diisocyanate (HDI), 1,5-naphthylene diisocyanate (NDI), 2,4- and/or 2,6-tolylene diisocyanate (TDI), 3,3'-dimethyl-4,4'-diisocyanatodiphenyl (TODI), p-phenylene diisocyanate (PDI), 1-isocyanato-3,3,5-trimethyl-5-isocyanatomethylcyclohexane (isophorone diisocyanate, IPDI) and 4,4'-, 2,4'- and 2,2'-methylenedicyclohexyl diisocyanate (H12MDI).

11. Thermoplastic polyurethane according to any of embodiments 1 to 10, wherein the molar ratio of the sum of the functionalities of the components of the employed polyol composition (PZ-2) and the chain extender to the sum of the functionalities of the employed isocyanate composition (PI) is in the range from 1:0.8 to 1:1.3.

12. Thermoplastic polyurethane according to any of embodiments 1 to 11, wherein the index in the reaction according to step (ii) is in the range from 965 to 1100.

13. Thermoplastic polyurethane according to any of embodiments 1 to 12, wherein the thermoplastic polyurethane has a Shore hardness in the range from 50 A to 80 D determined according to DIN 53505.

14. Thermoplastic polyurethane according to any of embodiments 1 to 13, wherein the thermoplastic polyurethane is opaque to transparent.

15. Process for producing a thermoplastic polyurethane having a glass transition temperature of the soft phase of not more than −25' C measured using DMA and a heating rate of 2K/min at 1 Hz under torsion based on DIN EN ISO 6721: 2016; maximum G" at least comprising the steps (i) and (ii):
    (i) reaction of a polyol composition (PZ-1) comprising at least one polyol based on polypropylene glycol, wherein the proportion of the secondary terminal OH groups based on the total number of terminal OH groups of the polypropylene glycol is in the range of >90%, with a polyisocyanate (P1) to obtain a polyol composition (PZ-2) comprising a prepolymer (PP-1),
    (ii) reaction of the polyol composition (PZ-2) comprising the prepolymer (PP-1) with a polyisocyanate composition (PI) comprising at least one polyisocyanate (P2) and at least one chain extender having a molecular weight <500 g/mol.

16. Process according to embodiment 15, wherein no storage or containerizing of the polyol composition (PZ-2) takes place between the reaction according to step (i) and the reaction according to step (ii).

17. Process according to either of embodiments 15 or 16, wherein the process is run as a continuous process.

18. Process according to any of embodiments 15 to 17, wherein in the reaction according to step (i) at least 30% of the secondary terminal OH groups of the polypropylene glycol are converted.

19. Process according to any of embodiments 15 to 18, wherein the polypropylene glycol has a number-average molecular weight Mn in the range from 650 g/mol to 4000 g/mol.

20. Process according to any of embodiments 15 to 19, wherein the polypropylene glycol has a number-average molecular weight Mn in the range from 1200 g/mol to 1750 g/mol and a polydispersity Pd of less than 1.5.

21. Process according to any of embodiments 15 to 20, wherein the reaction according to step (i) is carried out in a static mixer, reactive extruder or stirred tank (continuous stirred tank reactor, CSTR) or combinations thereof.

22. Process according to any of embodiments 15 to 21, wherein at least one polyol selected from the group consisting of polyether diols, polyester diols and polycarbonates or polycarbonate diols is added to the polyol composition (PZ-2) in the reaction according to step (ii).

23. Process according to any of embodiments 15 to 21, wherein no further polyol is added to the polyol composition (PZ-2) in the reaction according to step (ii).

24. Process according to any of embodiments 15 to 23, wherein the polyisocyanate (P2) is selected from the group consisting of methylenediphenyl diisocyanate (MDI), hexamethylene 1,6-diisocyanate (HDI), 1,5-naphthylene diisocyanate (NDI), 2,4- and/or 2,6-tolylene diisocyanate (TDI), 3,3'-dimethyl-4,4'-diisocyanatodiphenyl (TODI), p-phenylene diisocyanate (PDI), 1-isocyanato-3,3,5-trimethyl-5-isocyanatomethylcyclohexane (isophorone diisocyanate, IPDI) and 4,4'-, 2,4'- and 2,2-methylenedicyclohexyl diisocyanate (H12MDI).

25. Process according to any of embodiments 15 to 24, wherein the molar ratio of the sum of the functionalities of the components of the employed polyol composition (PZ-2) and the chain extender to the sum of the functionalities of the employed isocyanate composition (PI) is in the range from 1:0.8 to 1:1.3.

26. Process according to any of embodiments 15 to 25, wherein the index in the reaction according to step (ii) is in the range from 965 to 1100.

27. Process according to any of embodiments 15 to 26, wherein the thermoplastic polyurethane has a Shore hardness in the range from 50 A to 80 D determined according to DIN 53505.

28. Process according to any of embodiments 15 to 27, wherein the thermoplastic polyurethane is opaque to transparent.

29. Use of a thermoplastic polyurethane according to any of embodiments 1 to 14 or of a thermoplastic polyurethane obtainable or obtained by a process according to any of embodiments 15 to 28 for producing extruded, injection molded and pressed articles and also foams, shoe soles, cable sheathings, hoses, profiles, drive belts, fibers, nonwovens, films, moldings, plugs, housings, damping elements for the electricals industry, automotive industry, mechanical engineering. 3-D printing, medicine and consumer goods, in particular for producing injection molded products, extruded products, films, profiles and shaped articles.

30. Shaped article comprising a thermoplastic polyurethane according to any of embodiments 1 to 14 or a thermoplastic polyurethane obtainable or obtained by a process according to any of embodiments 15 to 28.

31. Thermoplastic polyurethane obtained or obtainable by a process at least comprising the steps (i) and (ii):
    (i) reaction of a polyol composition (PZ-1) comprising at least one polyol based on polypropylene glycol, wherein the proportion of the secondary terminal OH groups based on the total number of terminal OH groups of the polypropylene glycol is in the range of >90%, with a polyisocyanate (P1) to obtain a polyol composition (PZ-2) comprising a prepolymer (PP-1),
    (ii) reaction of the polyol composition (PZ-2) comprising the prepolymer (PP-1) with a polyisocyanate composition (PI) comprising at least one polyisocyanate (P2) and at least one chain extender having a molecular weight <500 g/mol.
32. Thermoplastic polyurethane according to embodiment 31, wherein the thermoplastic polyurethane has a glass transition temperature of the soft phase of not more than −25° C. measured using DMA and a heating rate of 2K/min at 1 Hz under torsion based on DIN EN ISO 6721: 2016; maximum G".
33. Thermoplastic polyurethane according to embodiment 31 or 32, wherein no storage or containerizing of the polyol composition (PZ-2) takes place between the reaction according to step (i) and the reaction according to step (ii).
34. Thermoplastic polyurethane according to any of embodiments 31 to 33, wherein the process is run as a continuous process.
35. Thermoplastic polyurethane according to any of embodiments 31 to 34, wherein in the reaction according to step (i) at least 30% of the secondary terminal OH groups of the polypropylene glycol are converted.
36. Thermoplastic polyurethane according to any of embodiments 31 to 35, wherein the polypropylene glycol has a number-average molecular weight Mn in the range from 650 g/mol to 4000 g/mol.
37. Thermoplastic polyurethane according to any of embodiments 31 to 36, wherein the polypropylene glycol has a number-average molecular weight Mn in the range from 1200 g/mol to 1750 g/mol and a polydispersity Pd of less than 1.5.
38. Thermoplastic polyurethane according to any of embodiments 31 to 37, wherein the reaction according to step (i) is carried out in a static mixer, reactive extruder or stirred tank (continuous stirred tank reactor, CSTR) or combinations thereof.
39. Thermoplastic polyurethane according to any of embodiments 31 to 38, wherein at least one polyol selected from the group consisting of polyether diols, polyester diols and polycarbonates or polycarbonate diols is added to the polyol composition (PZ-2) in the reaction according to step (ii).
40. Thermoplastic polyurethane according to any of embodiments 31 to 38, wherein no further polyol is added to the polyol composition (PZ-2) in the reaction according to step (ii).
41. Thermoplastic polyurethane according to any of embodiments 31 to 40, wherein the polyisocyanate (P2) is selected from the group consisting of methylenediphenyl diisocyanate (MDI), hexamethylene 1,6-diisocyanate (HDI), 1,5-naphthylene diisocyanate (NDI), 2,4- and/or 2,6-tolylene diisocyanate (TDI), 3,3'-dimethyl-4,4'-diisocyanatodiphenyl (TODI), p-phenylene diisocyanate (PDI), 1-isocyanato-3,3,5-trimethyl-5-isocyanatomethylcyclohexane (isophorone diisocyanate, IPDI) and 4,4'-, 2,4'- and 2,2'-methylenedicyclohexyl diisocyanate (H12MDI).
42. Thermoplastic polyurethane according to any of embodiments 31 to 41, wherein the molar ratio of the sum of the functionalities of the components of the employed polyol composition (PZ-2) and the chain extender to the sum of the functionalities of the employed isocyanate composition (PI) is in the range from 1:0.8 to 1:1.3.
43. Thermoplastic polyurethane according to any of embodiments 31 to 42, wherein the index in the reaction according to step (ii) is in the range from 965 to 1100.
44. Thermoplastic polyurethane according to any of embodiments 31 to 43, wherein the thermoplastic polyurethane has a Shore hardness in the range from 50 A to 80 D determined according to DIN 53505.
45. Thermoplastic polyurethane according to any of embodiments 31 to 44, wherein the thermoplastic polyurethane is opaque to transparent.
46. Process for producing a thermoplastic polyurethane at least comprising the steps (i) and (ii):
  (i) reaction of a polyol composition (PZ-1) comprising at least one polyol based on polypropylene glycol, wherein the proportion of the secondary terminal OH groups based on the total number of terminal OH groups of the polypropylene glycol is in the range of >90%, with a polyisocyanate (P1) to obtain a polyol composition (PZ-2) comprising a prepolymer (PP-1),
  (ii) reaction of the polyol composition (PZ-2) comprising the prepolymer (PP-1) with a polyisocyanate composition (PI) comprising at least one polyisocyanate (P2) and at least one chain extender having a molecular weight <500 g/mol.
47. Process according to embodiment 46, wherein the thermoplastic polyurethane has a glass transition temperature of the soft phase of not more than −25° C. measured using DMA and a heating rate of 2K/min at 1 Hz under torsion based on DIN EN ISO 6721: 2016; maximum G".
48. Use of a thermoplastic polyurethane according to any of embodiments 31 to 45 or of a thermoplastic polyurethane obtainable or obtained by a process according to any of embodiments 46 or 47 for producing extruded, injection molded and pressed articles and also foams, shoe soles, cable sheathings, hoses, profiles, drive belts, fibers, nonwovens, films, moldings, plugs, housings, damping elements for the electricals industry, automotive industry, mechanical engineering. 3-D printing, medicine and consumer goods, in particular for producing injection molded products, extruded products, films, profiles and shaped articles.
49. Shaped article comprising a thermoplastic polyurethane according to any of embodiments 31 to 45 or a thermoplastic polyurethane obtainable or obtained by a process according to any of embodiments 46 or 47.

The examples that follow serve to illustrate the invention, but are in no way limiting with respect to the subject matter of the present invention.

EXAMPLES

1. The Following Input Materials were Employed

Polyol 1: Polyether polyol having an OH number of 63 and a mixture of primary and secondary OH groups based on propylene glycol and ethylene glycol in a ratio of 3 to 1 (functionality: 1.99)

Polyol 2: Polyether polyol having an OH number of 104 and exclusively secondary OH groups based on propylene glycol (functionality: 1.99)

Polyol 3: Polyether polyol having an OH number of 78 and exclusively secondary OH groups based on propylene glycol (functionality: 1.99)

Polyol 4: Polyether polyol having an OH number of 114 and exclusively primary OH groups based on tetramethylene oxide (functionality: 2)

Polyol 5: Polyether polyol having an OH number of 55 and exclusively secondary OH groups based on propylene glycol (functionality: 1.99)

Isocyanate 1: Aromatic isocyanate (4,4'-methylenediphenyl diisocyanate)

Chain extender (CE) 1: butane-1,4-diol

Catalyst: Tin(II) isooctoate (50% in dioctyl adipate)

2. Production Examples

2.1 Example of a Discontinuous Synthesis According to the One-Shot Process

A thermoplastic polyurethane (TPU) was synthesized from 4,4'-diphenylmethane diisocyanate, butane-1,4-diol chain extender, tin(II) isooctoate catalyst and polyether polyol in a reaction vessel with stirring. After attaining a reaction temperature of 110° C. the solution was poured out onto a heating plate heated to 120° C. and the obtained TPU sheet was pelletized after heat treatment at 80° C. for 15 h. The pellet material was injection molded into 2 mm test specimens and the S2 test bars (according to DIN 53504) stamped out of them were subjected to mechanical tests. The maximum temperature of the melt during test specimen production was 240° C.

2.2 Example of a Discontinuous Synthesis According to the Prepolymer Process A prepolymer was synthesized from 4,4'-diphenylmethane diisocyanate, tin(II) isooctoate catalyst and polyether polyol in a reaction vessel with stirring at temperatures between 80° C. and 120° C. until >90% of the OH functionalities of the polyether polyol were converted. The prepolymer was subsequently converted into a thermoplastic polyurethane (TPU) by addition of butane-1,4-diol chain extender. After attaining a reaction temperature of 110° C. the solution was poured out onto a heating plate heated to 120° C. and the obtained TPU sheet was pelletized after heat treatment at 80° C. for 15 h. The pellet material was injection molded into 2 mm test specimens and the S2 test bars (according to DIN 53504) stamped out of them were subjected to mechanical tests. The maximum temperature of the melt during test specimen production was 240° C.

2.3 Example of a Continuous Synthesis According to the Prepolymer Process

A prepolymer was produced from 4,4'-diphenylmethane diisocyanate, tin(II) isooctoate catalyst and polyether polyol in an adiabatic continuous reactor with a residence time of approx. 10 minutes. Before entry into the reactor the reactants were premixed and heated to the reaction temperature of 100° C. to 120° C. At the end of the adiabatic continuous reactor the obtained prepolymer was cooled to 60° C. to 90° C. Admixing the butane-1,4-diol chain extender preheated to 60° C. and subsequent heating of the reaction mixture to 110° C. to 180° C. on a reaction belt with a residence time of 5 min to 10 min afforded a thermoplastic polyurethane (TPU). This was subsequently pelletized and injection molded into 2 mm test specimens. The S2 test bars (according to DIN 53504) stamped out of them were subjected to mechanical tests. The maximum temperature of the melt during test specimen production was 240° C.

3. Compositions of the Production Examples

TABLE 1

| Ex. | Isoc. 1 [g/min] | Polyol 1 [g/min] | Polyol 2 [g/min] | Polyol 3 [g/min] | Polyol 4 [g/min] | CE [g/min] | Cat. [ppm] | Process | |
|---|---|---|---|---|---|---|---|---|---|
| 1 | 562.56 | 800 | — | — | — | 159.32 | — | One-shot | Discont. |
| 2 | 562.56 | 800 | — | — | — | 159.32 | — | Prepo | Discont. |
| 3 | 618.58 | — | 750 | — | — | 160.12 | 4 | One-shot | Discont. |
| 4 | 618.58 | — | 750 | — | — | 160.12 | 4 | Prepo | Discont. |
| 5 | 548.96 | — | — | 750 | — | 151.97 | 4 | One-shot | Discont. |
| 6 | 548.96 | — | — | 750 | — | 151.97 | 4 | Prepo | Discont. |
| 7 | 600.62 | — | — | 720 | 80 | 163.87 | 4 | One-shot | Discont. |
| 8 | 600.62 | — | — | 720 | 80 | 163.87 | 4 | Prepo | Discont. |
| 9 | 158.6 | — | — | 214.4 | — | 42.8 | 2.4 | Prepo | Cont. |

4. Properties of the Production Examples

TABLE 2a

| | | EX 1 (reference) | EX 2 | EX 3 (reference) | EX 4 | EX 5 (reference) |
|---|---|---|---|---|---|---|
| Hard phase proportion | % | 39.6 | 39.6 | 39.6 | 39.6 | 39.6 |
| Producibility | | yes | yes | yes | yes | yes |
| Properties | | poor | good | poor | good | poor |
| Mw of pellet materials | [kD] | 93 | 132 | 81 | 93 | 78 |
| MFR 220° C./2.16 kg | g/10 min | 2.39 | 53.80 | no flow | flow | flow |
| MFR 220° C./5 kg | g/10 min | 58.14 | 195.88 | 59.44 | flow | flow |
| MFR 210° C./10 kg | g/10 min | | | | 70.58 | |
| MFR 210° C./2.16 kg | g/10 min | | | | | |
| MFR 180° C./21.6 kg | g/10 min | | | | | 78.79 |
| Density | [g/cm$^3$] | 1.156 | 1.157 | 1.151 | 1.154 | 1.139 |
| Shore A hardness | | 93 | 93 | 94 | 94 | 90 |
| Tensile strength | [MPa] | 9 | 21 | 8 | 22 | 5 |

TABLE 2a-continued

|  |  | EX 1 (reference) | EX 2 | EX 3 (reference) | EX 4 | EX 5 (reference) |
|---|---|---|---|---|---|---|
| Elongation at break | [%] | 180 | 670 | 70 | 590 | 30 |
| Stress at 100% elongation | [MPa] | 8.4 | 8.9 | —* | 11.1 | —* |
| Tear propagation resistance | [kN/m] | 35 | 52 | 28 | 73 | 17 |
| Compression set 72 h/23° C./30 min | [%] | 57 | 55 | 64 | 30 | 57 |
| Abrasion | [mm³] | 356 | 263 | 346 | 238 | 472 |
| Glass transition temperature soft phase (max. G″) | [° C.] | −50 | −45 | −30 | −25 |  |
| Glass transition temperature soft phase (max. tan δ) | [° C.] | −40 | −30 | −20 | −10 |  |
| Glass transition temperature soft phase (DSC) | [° C.] | −45 | −38 | −22 | −13 |  |

*not determinable

TABLE 2b

|  |  | EX 6 | EX 7 (reference) | EX 8 | EX 9 |
|---|---|---|---|---|---|
| Hard phase proportion | % | 39.6 | 39.6 | 39.6 | 39.6 |
| Producibility |  | yes | yes | yes | yes |
| Properties |  | good | poor | good | good |
| Mw of pellet materials | [kD] | 81 | 85 | 135 | 133 |
| MFR 220° C./2.16 kg | g/10 min | 64.10 | no flow | flow | 57.54 |
| MFR 220° C./5 kg | g/10 min | — | 52.98 | flow | 138.25 |
| MFR 210° C./10 kg | g/10 min |  |  |  |  |
| MFR 210° C./2.16 kg | g/10 min |  |  |  | 44.88 |
| MFR 180° C./21.6 kg | g/10 min |  |  |  |  |
| Density | [g/cm³] | 1.145 | 1.139 | 1.145 | 1.143 |
| Shore A hardness |  | 93 | 91 | 93 | 92 |
| Tensile strength | [MPa] | 34 | 4 | 31 | 38 |
| Elongation at break | [%] | 58 | 20 | 680 | 670 |
| Stress at 100% elongation | [MPa] | 10.7 | —* | 10.2 | 9.9 |
| Tear propagation resistance | [kN/m] | 73 | 18 | 73 | 77 |
| Compression set 72 h/23° C./30 min | [%] | 28 | 62 | 28 | 25 |
| Abrasion | [mm³] | 149 | 598 | 229 | 123 |
| Glass transition temperature soft phase (max. G″) | [° C.] | −35 | −40 | −35 | −25 |
| Glass transition temperature soft phase (max. tan δ) | [° C.] | −20 | −35 | −20 | −10 |
| Glass transition temperature soft phase (DSC) | [° C.] | −30 | −37 | −21 | −21 |

*not determinable

5. Production Examples with Different Polyol Mixtures

Various polyols or blends differing in the average molecular weight of the employed polyol were employed analogously to example 4.

The properties of the obtained thermoplastic polyurethanes are summarized in table TABLE 3a

|  |  | EX 10 | EX 11 | EX 12 | EX 13 |
|---|---|---|---|---|---|
| Employed polyol |  | E1190A | polyol 2 | polyol mixture (polyol 2:polyol 5) | polyol mixture (polyol 2:polyol 5) |
| Mass ratio of polyols |  | 100 | 100 | 80:20 | 50:50 |
| Mn |  |  | 1000 | 1200 | 1400 |
| Shore A hardness |  | 94 | 93 | 92 | 92 |
| Tensile strength | [MPa] | 56 | 25 | 20 | 24 |
| Elongation at break | [%] | 490 | 670 | 720 | 670 |
| Tear propagation resistance | [kN/m] | 112 | 84 | 65 | 63 |
| Abrasion | [mm³] | 42 | 213 | 258 | 241 |
| Glass transition temperature soft phase (max. G″) | [° C.] | −43 | −20 | −30 | −35 |

TABLE 3b

|  |  | EX 14 | EX 15 | EX 16 |
|---|---|---|---|---|
| Employed polyol |  | polyol mixture (polyol 2:polyol 5) | polyol mixture (polyol 2:polyol 5) | polyol 5 |
| Mass ratio of polyols |  | 30:70 | 15:85 | 100 |
| Mn |  | 1600 | 1800 | 2000 |
| Shore A hardness |  | 90 | 94 | 93 |
| Tensile strength | [MPa] | 12 | 21 | 16 |
| Elongation at break | [%] | 660 | 670 | 620 |
| Tear propagation resistance | [kN/m] | 46 | 63 | 49 |
| Abrasion | [mm³] | 286 | 240 | 281 |
| Glass transition temperature soft phase (max. G″) | [° C.] | −40 | — | −45 |

It is apparent that especially polypropylene glycols having higher molecular weights, for example an average molecular weight Mn of more than 2000, result in less favorable mechanical properties of the obtained thermoplastic polyurethane. The use of mixtures of different polypropylene glycols also results in poor mechanical properties.

6. Test Methods

Mechanical values were determined on injection-molded sheets which had previously been heat-treated at 100° C. for 20 hours.

Density: DIN EN ISO 1183-1, A: 2016
Shore A hardness: DIN ISO 7619-1: 2016
Tensile test: DIN 53 504: 2016
Tear propagation resistance: DIN ISO 34-1. B: 2016
Abrasion: DIN ISO 4649/ASTM D1044: 2016
Compression set: DIN ISO 815: 2016
MFR: DIN ISO 1133: 2016
DMA: DIN EN ISO 6721: 2016
(Torsion mode, frequency: 1 Hz, heating rate 2K/min) In a departure from the parameters specified in the DIN standard the parameters determined in the context of the present invention are measured using a stepped program comparable with a constant 2K/min heating rate program. Measurements are made with a 5 K stepped program and hold times per step of 35s. The measurements are performed on samples having a width to thickness ratio of 1:6.
DSC: DIN EN ISO 11357-1: 2016 (heating rate 20° C./min)
MW: DIN 55672-2: 1999-Teil2 (against PMMA from Polymer Standards Service; solution in DMAC)

CITED LITERATURE

WO 2014/060300 A1
WO 2007/101807 A1
EP 1757632 A1
EP 1391472 A1
EP 900812 A1
DE 19625987 A1
WO 02/064656A2
WO 93/24549 A1
US 2006/0258831 A1
EP 1746117 A1
"Kunststoffhandbuch", volume 7, "Polyurethane", Carl Hanser Verlag, 3rd edition, 1993, chapter 3.1
J. H. Saunders and K. C. Frisch "High Polymers", volume XVI, Polyurethane, Part 1 and 2, Interscience Publishers 1962 and 1964
Taschenbuch für Kunststoff-Additive, R. Gachter and H. Müller (Hanser Verlag Munich 1990)
DE-A 29 01 774 A1

The invention claimed is:

1. A thermoplastic polyurethane having a glass transition temperature of a soft phase of not more than −25° C. measured using DMA and a heating rate of 2K/min at 1 Hz under torsion based on DIN EN ISO 6721: 2016; maximum G" obtained by a process at least comprising steps (i) and (ii):
   (i) reacting a first polyol composition comprising at least one polyol based on polypropylene glycol, wherein a proportion of secondary terminal OH groups based on a total number of terminal OH groups of the polypropylene glycol is in a range of >90% and the polypropylene glycol has a number-average molecular weight Mn in a range from 650 g/mol to 4000 g/mol, with a first polyisocyanate to obtain a second polyol composition comprising a prepolymer,
   (ii) reacting the second polyol composition comprising the prepolymer with a polyisocyanate composition comprising at least one second polyisocyanate and at least one chain extender having a molecular weight <500 g/mol, wherein the reaction according to step (i) is carried out continuously.

2. The thermoplastic polyurethane according to claim 1, wherein no storage or containerizing of the second polyol composition takes place between the reacting according to step (i) and the reacting according to step (ii).

3. The thermoplastic polyurethane according to claim 1, wherein the process is run as a continuous process.

4. The thermoplastic polyurethane according to claim 1, wherein in the reacting according to step (i) at least 30% of the secondary terminal OH groups of the polypropylene glycol are converted.

5. The thermoplastic polyurethane according to claim 1, wherein the polypropylene glycol has a polydispersity Pd of less than 1.5.

6. The thermoplastic polyurethane according to claim 1, wherein the polypropylene glycol has a number-average molecular weight Mn in a range from 1200 g/mol to 1750 g/mol and a polydispersity Pd of less than 1.5.

7. The thermoplastic polyurethane according to claim 1, wherein the reacting according to step (i) is carried out in a static mixer, reactive extruder or stirred tank (continuous stirred tank reactor, CSTR) or combinations thereof.

8. The thermoplastic polyurethane according to claim 1, wherein at least one polyol selected from the group consisting of polyether diols, polyester diols, polycarbonates, and polycarbonate diols is added to the second polyol composition in the reacting according to step (ii).

9. The thermoplastic polyurethane according to claim 1, wherein no further polyol is added to the second polyol composition in the reacting according to step (ii).

10. The thermoplastic polyurethane according to claim 1, wherein the second polyisocyanate is selected from the group consisting of methylenediphenyl diisocyanate (MDI), hexamethylene 1,6-diisocyanate (HDI), 1,5-naphthylene diisocyanate (NDI), 2,4-tolylene diisocyanate, 2,6-tolylene diisocyanate, 3,3'-dimethyl-4,4'-diisocyanatodiphenyl (TODI), p-phenylene diisocyanate (PDI), 1-isocyanato-3,3,5-trimethyl-5-isocyanatomethylcyclohexane (isophorone diisocyanate, IPDI), 4,4'-methylenedicyclohexyl diisocyanate, 2,4'-methylenedicyclohexyl diisocyanate, and 2,2'-methylenedicyclohexyl diisocyanate.

11. The thermoplastic polyurethane according to claim 1, wherein a molar ratio of a sum of functionalities of components of the second polyol composition and the chain extender to a sum of functionalities of the polyisocyanate composition is in a range from 1:0.8 to 1:1.3.

12. The thermoplastic polyurethane according to claim 1, wherein the thermoplastic polyurethane has a Shore hardness in a range from 50 A to 80 D determined according to DIN 53505.

13. The thermoplastic polyurethane according to claim 1, wherein the thermoplastic polyurethane is opaque to transparent.

14. A process for producing a thermoplastic polyurethane having a glass transition temperature of a soft phase of not more than −25° C. measured using DMA and a heating rate of 2K/min at 1 Hz under torsion based on DIN EN ISO 6721: 2016; maximum G", the process at least comprising steps (i) and (ii):
   (i) reacting a first polyol composition comprising at least one polyol based on polypropylene glycol, wherein a proportion of secondary terminal OH groups based on a total number of terminal OH groups of the polypropylene glycol is in a range of >90%, with a first polyisocyanate to obtain a second polyol composition comprising a prepolymer, (ii) reacting the second polyol composition comprising the prepolymer with a polyisocyanate composition comprising at least one second polyisocyanate and at least one chain extender having a molecular weight <500 g/mol, wherein the reaction according to step (i) is carried out continuously.

15. A process of obtaining a thermoplastic polyurethane article, the process comprising:
producing the article with the thermoplastic polyurethane according to claim 1,
wherein the article is selected from the group consisting of extruded, injection molded and pressed articles, foams, shoe soles, cable sheathings, hoses, profiles, drive belts, fibers, nonwovens, films, moldings, plugs, housings, damping elements for the electricals industry, automotive industry, mechanical engineering, 3-D printing, medicine and consumer goods.

16. A shaped article comprising the thermoplastic polyurethane according to claim 1.

17. The thermoplastic polyurethane according to claim 1, wherein the first polyisocyanate and the second polyisocyanate are the same.

18. The process according to claim 14, wherein the first polyisocyanate and the second polyisocyanate are the same.

19. The thermoplastic polyurethane according to claim 1, wherein the process is carried out under adiabatic conditions.

20. The thermoplastic polyurethane according to claim 1, wherein (i) is carried out at a temperature in the range from 60° C. to 300° C.

* * * * *